United States Patent [19]

Maxey

[11] 3,992,122

[45] Nov. 16, 1976

[54] HIGH VELOCITY, LOW-FRICTION BORING TOOL

[75] Inventor: Robert E. L. Maxey, Irwin, Pa.

[73] Assignee: Westinghouse Electric Corporation, Pittsburgh, Pa.

[22] Filed: Mar. 8, 1976

[21] Appl. No.: 665,142

Related U.S. Application Data

[63] Continuation of Ser. No. 443,889, Feb. 19, 1974, abandoned.

[52] U.S. Cl. ............................. 408/72 B; 308/6 B; 408/80; 408/241 B
[51] Int. Cl.² ........................................ B23B 45/14
[58] Field of Search ............... 408/80, 81, 72, 72 B, 408/241 B; 308/6 B, 189 R

[56] References Cited
UNITED STATES PATENTS

| | | | |
|---|---|---|---|
| 2,311,815 | 2/1943 | Briney, Jr. | 308/189 R |
| 2,372,626 | 3/1945 | Fenner | 408/72 |
| 2,643,554 | 6/1953 | Sperisen | 408/241 X |
| 3,011,369 | 12/1961 | Russell | 408/72 X |
| 3,143,902 | 8/1964 | Turner | 408/81 X |
| 3,331,266 | 7/1967 | Brooks | 408/80 |
| 3,453,898 | 7/1969 | Kopczynski | 308/6 B |
| 3,688,592 | 9/1972 | Kopczynski | 308/6 B X |
| 3,756,736 | 9/1973 | Marcoux | 408/241 B X |
| 3,881,396 | 5/1975 | Case | 408/80 X |

FOREIGN PATENTS OR APPLICATIONS

| | | | |
|---|---|---|---|
| 30,045 | 6/1964 | Germany | 408/72 B |

Primary Examiner—Othell M. Simpson
Assistant Examiner—W. R. Briggs
Attorney, Agent, or Firm—G. H. Telfer

[57] ABSTRACT

A high velocity, low-friction boring bar for boring holes through any machineable material. The boring bar comprises a cylindrical shaft having a boring head thereon rotatably and slidably disposed within a bearing member. The bearing member is surrounded by a housing which supports the boring bar as it extends through a hole-locating member.

5 Claims, 2 Drawing Figures

HIGH VELOCITY, LOW-FRICTION BORING TOOL

This is a continuation of application Ser. No. 443,889 filed Feb. 19, 1974, now abandoned.

BACKGROUND OF THE INVENTION

1. Field of the invention:

This invention relates to cutting tools, and in particular, to a high speed, low-friction boring tool.

2. Description of the Prior Art:

To provide holes in any machineable material, such as metal stock used for the mounting flanges for a dynamoelectric apparatus, the location of the holes and their size is presently obtained by the use of a drill jig and a slip bushing. The location of the holes to be drilled into the metal stock is fixed by the use of the member known as the drill jig. The drill jig is usually fabricated of steel and has drilled therethrough a predetermined number of holes having predetermined diameters and located at predetermined positions on the jig. The holes are accurately configured into the drill jig in a predetermined pattern, thus, if a particular arrangement of holes is sought, the appropriate drill jig is chosen and disposed over the metal stock to be cut.

The diameter of the hole drilled is obtained through the use of an appropriately sized slip bushing member. The bushing, having the desired diameter sought, is inserted into one of the openings in the drill jig. Thus, any desired configuration of holes having a desired diameter and location is obtainable by using an appropriate drill jig member and an appropriate slip bushing. Presently, the process of enlarging a previously drilled hole in the machineable material first requires the utilization of a core drill. The drill is extended through the slip bushing which as a diameter less than the diameter sought. The drill is passed through the stock providing a first rough bore through the material to be bored. Usually, the original drilled hole is misaligned in its passage through the stock, and thus, a core drilling operation is required.

After the drilled hole has been opened up with the core drill, the drill is withdrawn and the first slip bushing is removed from the drill jig. A second slip bushing, having a slightly larger diameter than the first bushing is inserted into the jig and a rough machine reamer is passed through the metal stock. The second bushing is then withdrawn and another slip bushing, having the desired diameter sought, is inserted into the drill jig. A finish reamer apparatus expands the diameter of the correctly aligned rough bore to provide the bore with the desired dimension and inclination through the metal stock.

Both the core drill and the reamer apparatus are difficult to maintain within predetermined tolerances throughout the drilling and reaming operations. Also, when using a slip bushing with either of these cutting tools, it is necessary to operate at low peripheral speeds due to heat generated between the tool head and the bushing. Thus, the boring process is presently limited to relatively low cutting speeds on the order of 60 surface feet per minute (SFPM). In addition to this low cutting speed, the various drilling and reaming processes and the corresponding insertion of the appropriate slip bushings into the drill jig make the process of providing accurately located and sized holes through metal stock an expensive and time consuming process. Although the patent to Briney, U.S. Pat. No. 2,311,815, provides a bearing member to surround the rotating tool shaft, it will be observed that the bearing taught by Briney provides rotational and reciprocal support to a slowly rotating shaft only.

It is therefore advantageous to provide a boring tool able to operate at high cutting velocities without generation of excessive frictional heat. It is also advantageous to eliminate the need for a plurality of different sized slip bushings in order to obtain the desired size hole through the metal stock.

SUMMARY OF THE INVENTION

This invention discloses a high velocity, low friction boring tool for providing holes located in predetermined positions by a drill jig into any machineable material. The boring bar comprises an elongated cylindrical shaft member having a cutting head disposed thereon. The shaft is coaxially surrounded by a low-friction bearing member which permits rotation, axial and reciprocal displacement of the boring shaft therethrough. A housing member completely surrounds the bearing member and has an axially extending sheath thereon which engages the drill jig. The sheath provides a radial clearance between it and the cutting tool which, when coupled with the bearing member surrounding the shaft, permit high speed operation of the boring tool. A shoulder on the housing permits extension of the sheath into the drill jig for a predetermined distance. Suitable lubrication within the bearing member and means for preventing rotation of the housing relative to the drill jig are provided.

It is an object of this invention to provide a high speed, low-friction boring tool for cutting a predetermined sized hole into any machineable material. It is desirable, and thus a further object of this invention, to provide a boring tool which may be operated at high velocities yet generate little frictional heating. It is a further object of this invention to provide a boring tool which may be operated at high velocities with low-frictional heating to accurately bore holes having a predetermined diameter through any machineable material in conjunction with a drill jig.

BRIEF DESCRIPTION OF THE DRAWINGS

The invention will be more fully understood from the following detailed description of an illustrative embodiment taken in connection with the accompanying drawings, in which.

DESCRIPTION OF THE PREFERRED EMBODIMENTS

Figure 2:
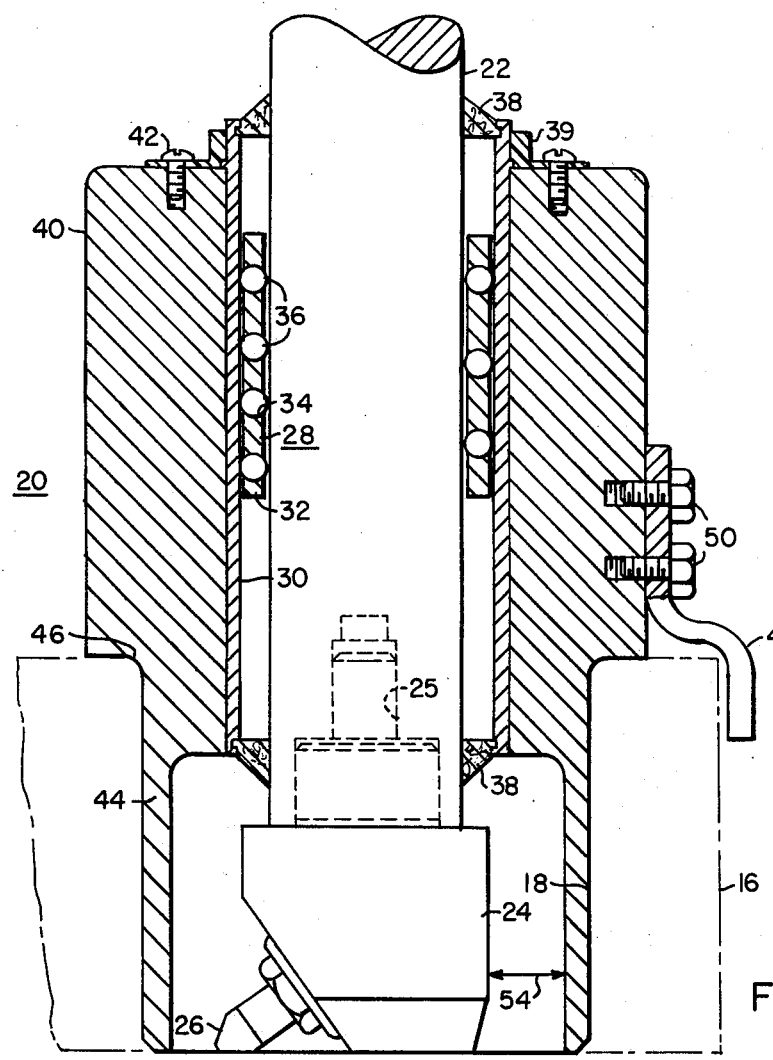

Throughout the following description, similar reference characters refer to similar elements in all figures of the drawings.

Figure 1:
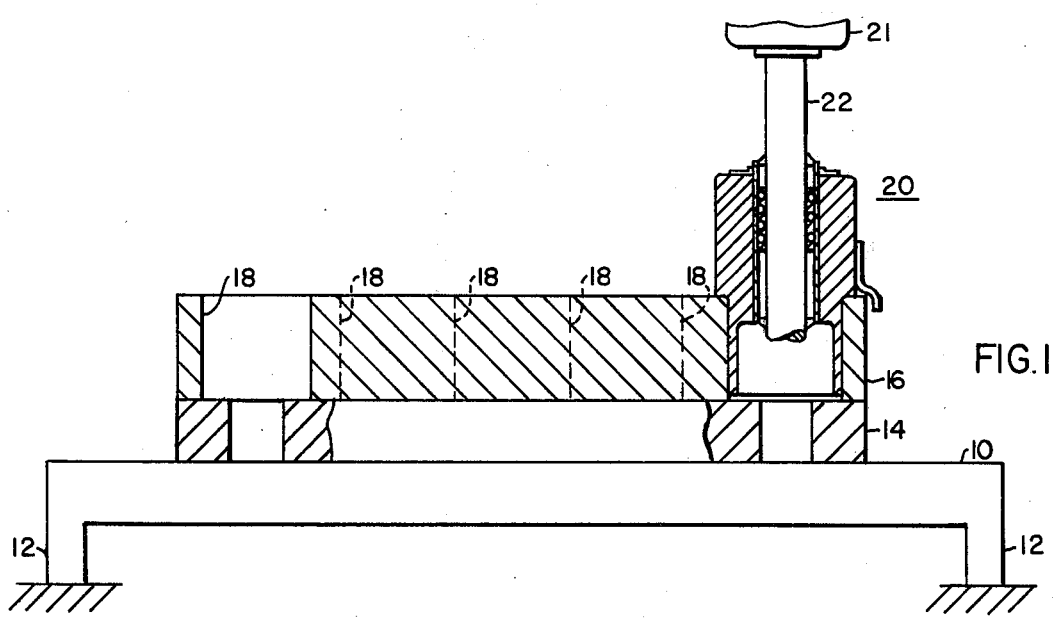
FIG. 1 is an elevational view, partly in section, showing a high velocity low-friction boring tool as taught by this invention; and, FIG. 2 is an elevational view, partly in section, of the high velocity low-friction boring tool taught by this invention.

Referring now to FIG. 1, an elevational view partly in section, of a high speed, low-friction boring tool utilizing the teachings of this invention and disposed on a drill apparatus for drilling holes into metal stock is shown.

In FIG. 1, a cutting table 10 is securely mounted on and supported by a pedestal 12 and has a sheet of any machineable material 14, such as metal stock, through which a desired number of holes having a predetermined diameter are sought to be bored. The material stock 14 could be used for a variety of purposes, such as, the coupling flange for a large dynamoelectric apparatus. A typically sized hole for a 3 inch thickness coupling flange is a hole with a 3 inch diameter. The allowable tolerance on this 3 inch diameter is .0005 inch. It is also to be understood that rough bore holes are provided in the stock 14 before any drilling operation utilizing a device taught by this invention is done.

A drill jig member 16 having a predetermined number of holes 18 accurately positioned and extending therethrough is disposed atop the stock 14.

A boring tool 20 utilizing the teachings of this invention extends through one of the predetermined holes 18 located within the drill jig 16. The boring tool 20 is attached to suitable drive apparatus 21, which is operable by a remote numerical control system (not shown) or other suitable governor apparatus.

Referring now to FIG. 2, an enlarged elevational view, partially in section, of the boring tool 20 taught by this invention is shown. The boring tool 20 comprises an elongated cylindrical shaft member 22 having a vernier-micrometer dial adjustable boring head member 24 attached thereto. The shaft 22 is fabricated of metal ground to a predetermined finish of at least 10 micro inches. The shaft 22 is attached to the drive apparatus 21 as shown in FIG. 1. The metal shaft 22 is a cylindrical member having a counterbore and tapped hole 25 at one end a predetermined distance thereinto. The head 24 has a carbide or ceramic cutting tip 26 attached thereto. The head 24 is securely threaded into the bore 25 of the shaft 22. The cutting tip 26 comprises an indexable insert or a braze-type tip which can be of any type of cutting tool material inserted into a vernier-micrometer dial adjustable cartridge, which in turn is mounted into boring head 24. Thus, cutting tip 26 is accurately indexable within predetermined tolerances on the diameter by the simple expedient of interchanging the cutting tip 26. The head 24 and cutting tip 26 are sold by Valeron Corp., under the Tradename E-Z Set.

Coaxially surrounding the shaft 22 is a high speed, low friction pre-loaded bearing member 28. The bearing member 28 has a wall 30 which extends substantially parallel to and concentric with the shaft 22. The bearing member 28 is sold by Landis & Gyr, Inc., under the tradename ROTOLIN.

An annular ball bearing support cage 32 is disposed within the bearing wall 30 and has a predetermined number of openings 34 therein. A predetermined number of high carbon chromium steel balls 36 are disposed within the openings 34 in the cage 32. The bearing balls 36 are preloaded against the shaft. Pre-loading is a condition in which the balls 36 are compressed against the shaft 22, yet still able to rotate about their own axes, according to movement of the cage 32. The steel balls 36 provide the low friction surface which permits the shaft 22 to be rotationally, axially and reciprocally displaced within the bearing member 28. As viewed in FIG. 2, the cage 30 is not coextensive with the bearing wall 30, and thus provides an axial distance in which the cage 32 is displaceable within the bearing wall 30. Space for the disposition of suitable lubrication, such as silicone grease, adapted for operation in temperature range of −40 to +100° C, is provided within the bearing wall 30 around the shaft 22 to aid in high speed operation of the boring tool 20. Leakage of the lubrication from within the bearing wall 30 is prevented by low-friction molded wiper seals 38 disposed around the shaft 22 at each axial end of the bearing 28. A flange 39 extends from one seal 38.

A housing member 40 coaxially surrounds the bearing member 28 and is secured to the bearing wall 30 by an interference fit and screws 42 extend through the flange 39 of the seal 38 into the body of the housing 40. The housing 40 has an elongated sheath extension 44 extending axially therefrom. The sheath extension 44 extends into and is received by the hole 18 in the drill jig 16. The sheath extension 44 is extendable into the drill jig 16 for a predetermined distance, and a shoulder 46 on the housing 40 prevents further extension of the sheath extension 44 into the drill jig 16.

A stop member 48 is securely affixed to the housing 40 by suitable attachment means, such as screws 50. The stop 48 extends over the edge of the drill jig 16 as is illustrated in FIG. 2, and maintains the housing 40 stationary relative to the drill jig 16.

During operation, the sheath extension 44 of the housing 40 is extended into and received by one of the holes 18 of the drill jig 16. The shoulder 46 permits only a predetermined extension into the hole 18 of the jig 16 and the stop 48 prevents rotation of the housing 40 with respect to the jig 16. The cutting head 24 mounted on the shaft 22 defines a predetermined radial clearance 54 between it and the interior of the shaft extension 44. The radial clearance 54 between the cutting tool tip 26 and the sheath extension 44 assures that no abrasion will occur therebetween.

In the prior art, a slip bushing is inserted into a hole in the drill jig and the tool, either a reamer or core drill, is extended into the slip bushing. It is apparent that the abrasion between the tool and the slip bushing generates frictional heating which inhibits high speed operation of the tool. With a boring tool 20 taught by this invention, the use of a slip bushing is no longer required, and the bearing member 28 between shaft 22 and cage 32 minimizes the amount of frictional heating generated. The combined effect of the bearing 28 moving in a rotary and linear motion and using a lubricant enable high speed operation of the boring tool 20 without generation of excessive frictional heating. The tool 20 can operate at any predetermined rotational speed in the range of 0–12000 RPM, as compared to 100–200 RPM in the prior art.

The provision of the head 24 with the interchangeable cutting tip 26 permits tolerances and adjustments to the cutting tip 26 to be graduated in increments of .0001 inch. Such precision control eliminates the inaccuracies involved with the present use of reamers and core drills. Utilization of the boring tool 20 taught by this invention permits a boring operation to be accomplished without the necessity of changing slip bushings and without requiring separate core drilling and reaming operations as required by the prior art. In addition, the boring tool 20 permits operation at rotational speeds not obtainable by the present art drills and reamers, and with less frictional heating. Also, control of tolerances through the use of interchangeable, indexable cutting tips 26 permits greater accuracy in the finished bore than is presently available.

As an example, the device taught by this invention can hold a 0.0005 inch tolerance on 12–3 inch holes through 3 inch thick stock used for two mating coupling flanges for a large dynamoelectric apparatus. Such precision is obtainable in prior art devices only through repeated grindings of the prior art cutting heads to insure that such a tolerance is maintained. Of course, such repetition adds to the time required, and to the overall cost of using prior art devices. It is again to be noted that the cutting tip on a device taught by this invention is indexable in .0001 inch gradations.

Since the cutting tip 26 is a throwaway insert, it can be discarded when no longer usable. Therefore the cost of re-grinding core drills and reamers as done in the present art is replaced by the cost of the less expensive cutting tip 26. Since only one boring operation is required to achieve the desired size hole in the stock, the production time involved in boring operations is greatly reduced over the prior art which requires two or three drilling and reaming operations.

The boring tool 20 taught by this invention is readily adaptable for use with any machine tool which must be used to ream holes with the aid of a drill jig. Provision of a floater member between the shaft 22 and the drive apparatus 21 (FIG. 1) is the only adjustment required. The floater member is provided to eliminate any slight variations between centerline of the drive 21, and the centerline of the hole 18 in drill jig 16.

The patent issued to Briney U.S. Pat. No. 2,311,815, provided a bearing member around a spindle and permitted both rotational and reciprocal displacement of the spindle. However, in Briney, it is specifically pointed out that the tool therein described is usable only for slowly rotatable shafts. As is pointed out herein, the boring tool 20 taught by this invention is operable at rotational speeds in the range of 0–12000 RPM.

Also, Briney discloses no integrated housing having a lubricated bearing therein as is taught by this invention. Briney does not dispose lubrication in his bearing, again emphasizing the low speed range of operation contemplated by that invention. Indeed, the disposition of lubrication in the bearing of Briney would be difficult to maintain therein due to the lack of an efficient seal. In Briney, the use of steel end plates would not serve to seal or maintain lubrication within the bearing housing, and would have a further disadvantage in that contact between the steel end plates and a high speed shaft would damage both the shaft and the end plates.

It is thus seen that a boring tool taught by this invention provides a faster, more economical, more accurate and more efficient means of providing holes in metal machineable stock. Use of the boring tool taught herein permits high speed operation of the boring tool within rotational speed ranging from 0–12000 RPM instead of the slowly rotating 100–200 RPM used in the prior art. The boring tool is more accurate, the cutting tip being indexable to 0.0001 inch, thus eliminating the repeated drilling and reaming operations required in the prior art. In addition, the extension sheath eliminates the need for various slip bushing sizes for use with the drill jig, again cutting the present high cost of drilling and reaming operations.

I claim as my invention:

1. A high speed, low friction, boring tool for boring holes located in any machinable material by a drill jig member, said drill jig member being distinct from and positioned upon said machinable material, said tool comprising:

an elongated cylindrical shaft member;

a cutting head interchangeably mounted on said shaft member, said cutting head having variable cutting means to cut holes within a predetermined size range within said machinable material, a housing coaxially surrounding a portion of said shaft, said housing and the surface of said shaft cooperating to define a completely enclosed annular bearing chamber, a low friction ball bearing member coaxially disposed within said enclosed annular bearing chamber, said low friction ball bearing member engaging said shaft and said housing to permit said shaft to displace rotationally and axially on said low friction ball bearing member;

said housing member having an axially extending, cylindrical, sheath integral therewith, said sheath being disposed axially on said housing from that portion of said housing defining said enclosed annular bearing chamber, said sheath being sized to engage an aperture in said drill jig, directly, and being axially withdrawable therefrom, to guide said cutting head to said machinable material, said housing having means for bearing on said drill jig said cutting head being maintained at least a predetermined distance from said sheath.

2. The high speed boring tool of claim 1, wherein a lubricant is disposed within said enclosed annular bearing chamber and surrounding said shaft member.

3. The high speed boring tool of claim 1, wherein a stop member is attached to said housing member, said stop member non-intrusively engaging the exterior of said drill jig to maintain said housing member stationary relative to said drill jig.

4. The high speed boring tool of claim 2, further comprising seal means for preventing leakage of said lubricant from said enclosed annular bearing chamber.

5. The high speed boring tool of claim 1, wherein said tool is operable at a predetermined speed within a range of rotational speeds from 0 to 12000 revolutions per minute.

* * * * *